United States Patent [19]

Anghileri et al.

[11] Patent Number: 5,994,441
[45] Date of Patent: *Nov. 30, 1999

[54] ACRYLIC POLYMERS FOR MOLDING

[75] Inventors: Andrea Anghileri; Michele Fatica; Pasquale Relvini, all of Milan, Italy

[73] Assignee: ELF Atochem Italia S.r.l., Milan, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/634,298

[22] Filed: Apr. 18, 1996

[30] Foreign Application Priority Data

Apr. 21, 1995 [IT] Italy .............................. MI95A000816

[51] Int. Cl.⁶ ...................................................... C08K 5/04
[52] U.S. Cl. ......................... 524/395; 264/1.1; 264/2.5; 264/328.1; 524/394; 524/397; 524/399
[58] Field of Search ..................... 524/394, 395, 524/397, 399; 525/274; 264/328.1, 1.1, 2.5

[56] References Cited

U.S. PATENT DOCUMENTS

| | | |
|---|---|---|
| 3,663,466 | 5/1972 | Jablonski ............................. 524/394 X |
| 3,976,611 | 8/1976 | Aloia ..................................... 524/394 X |
| 4,396,730 | 8/1983 | Imahashi ............................. 524/394 X |
| 4,499,227 | 2/1985 | Bailey .................................. 524/394 X |
| 4,525,517 | 6/1985 | Sato ....................................... 524/394 |
| 4,539,352 | 9/1985 | Chung et al. ....................... 524/394 X |
| 4,797,440 | 1/1989 | Schofield et al. .................. 524/394 X |
| 4,837,264 | 6/1989 | Zahradnik et al. ................. 524/394 X |
| 5,028,649 | 7/1991 | Efner ...................................... 524/394 |
| 5,100,937 | 3/1992 | Kubo et al. ......................... 524/394 X |
| 5,162,416 | 11/1992 | Udipi ................................... 524/394 X |
| 5,395,870 | 3/1995 | Suzuki et al. ....................... 524/394 X |
| 5,407,988 | 4/1995 | Kogowski ............................. 524/394 |

FOREIGN PATENT DOCUMENTS

| | | |
|---|---|---|
| 54-40855 | 3/1979 | Japan . |
| 61-188424 | 8/1986 | Japan . |
| 4-279242 | 10/1992 | Japan . |
| 1078738 | 8/1967 | United Kingdom . |

*Primary Examiner*—Judy M. Reddick
*Attorney, Agent, or Firm*—Burns, Doane, Swecker & Mathis, L.L.P.

[57] ABSTRACT

Use of monovalent salts of saturated and unsaturated fatty acids $C_{10}$–$C_{18}$ as external lubricants in granules formulation based on acrylic polymers for injection molding at temperatures from 180° C.–220° C. of articles having a thickness greater than 10 mm, preferably the lubricant amount is from 10 to 100 ppm; and related compositions.

10 Claims, No Drawings

ACRYLIC POLYMERS FOR MOLDING

FIELD OF THE INVENTION

The present invention relates to granules of acrylic polymers for molding. In particular it relates to compositions containing granules of acrylic polymers for preparing articles of high thickness, generally greater than 10 mm and capable of reaching 50 mm or more, having high optical properties, said articles being obtained by injection molding at low temperatures, in the range of about 180°–220° C.

BACKGROUND OF THE INVENTION

It is well known that for preparing articles of acrylic polymers, for instance polymethylmethacrylate (PMMA), with high thickness, low molding temperatures are generally recommended for the reasons listed hereinafter:

articles are obtained with higher optical purity, as the degradation of the material is minimized and therefore the yellowing of the same is minimized;

cooling times in the mold, normally rather long for pieces having a high thickness, are reduced;

eddies, shrinkages and cooling stresses are reduced, because of the lower thermal gradient between melted mass and mold.

The typical molding temperatures normally used for PMMA being in fact of the order of 230°–250° C., and do not allow to obtain articles of high purity, as stressed by the yellow index, even though they show a good aesthetic aspect.

The drawback of molding processes employing low temperatures consists in that strong frictions are generated in the feeding zone with localized overheating causing in a stochastic way on the finished piece white or silver stripes which irreparably compromise the article aesthetics.

In order to overcome this drawback it is known that frictions can be reduced using external lubricants which are added on the granules surface. However the presence of external lubricants, when relatively low molding temperatures are used, causes the appearance of haze in the polymer which is well visible in articles with high thickness. The onset of this diffused haze on the whole piece leads to an article having poor aesthetic characteristics.

DESCRIPTION OF THE INVENTION

It has been unexpectedly and surprisingly found that it is possible to obtain articles having a high thickness, with good optical properties and high aesthetic aspect, by using granules of acrylic polymers by injection molding at low temperature if a particular class of external lubricants is utilized in the range defined below.

Object of the invention is the use of monovalent salts, for instance alkaline metals, such as lithium, sodium, potassium or ammonium salts, of saturated and unsaturated, preferably saturated, fatty acids $C_{10}$–$C_{18}$, as external lubricants for granules of acrylic polymers for injection molding at temperatures from 180° to 220° C. of articles having a thickness greater than 10 mm.

For instance oleates, stearates, palmitates can be mentioned; the lithium stearates are preferred.

Tests carried out by the Applicant have shown that the typical external lubricants of the prior art are not suitable to produce the combination of the results of the present invention. For instance tests with Zn, calcium and magnesium stearates cause haze phenomena with consequent loss of optical properties.

The typical levels of external lubricant of the present invention are generally preferred between 10 and 100 ppm, more preferably between 20 and 50 ppm. It has been found that if amounts higher than 100 ppm are used, generally of the order of 150, a reduction of the optical properties, such as haze and yellowing, occurs. Moreover, if a reduction of the friction is really obtained, however, if this is too high it causes slipping phenomena in the feeding zone.

The addition of external lubricants of the invention is preferably carried out in a rotation reflux mixer at low rates, of about 10–40 rpm. Very high mixings are not necessary and this is a further advantage of the invention. The addition is generally carried out on the production line, in particular during the granules transport phase to stocking.

The sizes of articles with high thickness according to the present invention are generally of the order of 40–60× 40–50×20–30 mm.

The molding of granules of the acrylic polymers is carried out by injection molding with a feed flow rate in the cavity generally comprised from 10 to 50 mm/sec.

For acrylic polymers according to the present invention we mean homopolymers or copolymers of the alkyl esters of the acrylic or methacrylic acid wherein the alkyl group contains from 1 to 8 carbon atoms. Examples of such monomers are methylacrylate, ethylacrylate, propylacrylate, isopropylacrylate, butylacrylate, methylmethacrylate, ethylmethacrylate, isopropylmethacrylate, sec-butylmethacrylate, terbutylmethacrylate, etc.

The acrylic polymers can moreover contain up to 50% by weight of units derived from other monomers containing double bonds such as styrene, alpha-methylstyrene, acrylonitrile, (meth)acrylamide, n-alkyl or aryl maleimides, etc. or from monomers having double unsaturation such as, for instance, butadiene.

Polymethylmethacrylate is preferred. Any acrylic polymer suitable for injection molding can be used according to the present invention. The types of PMMA commercialized by Atohaas, such as Altuglas®: GR 9D, GR 7, GR 5; GR 9E, GR7E, GR 84, GR 9DFG; and Oroglas®: V 825, V 826, V 920, VM 9, V 044, V 052, can for instance be mentioned.

In order to better understand the present invention, some illustrative examples but not limitative of the same are reported hereinunder.

EXAMPLE 1

(Comparative)

5 Kg of PMMA granules, having weight average molecular weight Mw 80,000, with designation according to ISO 8257-1 PMMA, MN, 108-030-53 commercialized by Atohaas as Altuglas® GR 9DFG, are dried for 4 hours at 80° C. in a forced air circulation oven, then molded by means of an injection press, previously cleared by passing through the same PMMA according to known techniques, to obtain a block of 45×45×25 mm size and having a central feeding channel of ø 13 mm and length of 40 mm positioned on the surface 45 mm×45 mm.

The material is molded by setting different temperatures of the plasticization cylinder. In particular the tests are carried out at the following temperatures: at 240°, at 230°, at 220°, at 210°C. The other processing conditions are indicated hereinafter and are not modified when the molding temperature changes:

set maximum injection pressure 70 bar, screw feed rate 45 mm/sec, screw diameter 35 mm, average post-pressure 65 bar, post-pressure time 120/sec, screw rotation rate 60 rpm, mold temperature 60° C.

For each temperature 12 articles are molded, and the yellow index is measured according to ASTM D1925 standard with D65 illuminant on the greatest size (45 mm) of the last ten. The characteristics as an average of 10 samples are reported.

The presence of defects, such as bubbles, stripes, halos, is visibly evaluated. As good it is meant that no sample out of 10 shows a kind of the defects indicated above. The handmade article does not pass the test if at least one sample out of 10 shows a defect.

The results are reported in Table 1.

TABLE 1

Characteristics + Yellow index and aesthetic aspect

| Molding temperature (° C.) | Yellow Index 45 mm | Aesthetic aspect: visual evaluation |
|---|---|---|
| 240 | 4.5 | good |
| 230 | 4.2 | good |
| 220 | 3.5 | some stripes on some samples |
| 210 | 3.3 | localized white stripes[1] |

[1]stripes are present on all ten samples.

It can be noticed that by reducing the molding temperature the yellow index improves, but at 210° C. some typical white stripes of localized overheatings of the material appear in the feeding zone.

EXAMPLE 2

(Comparative)

the granules of Altuglas 9 DFG of Example 1 (5 kg) are added to a rotation reflux mixer having a rate of 20 rpm with 25 ppm and 75 ppm of zinc stearate. The samples of the so obtained granules are injection molded under the same conditions of Example 1. The yellow index and the aesthetic aspect of the articles are evaluated. The results are reported in Tables 2–4.

TABLE 2

Altuglas GR 9DFG type granules added with 25 ppm of zinc stearate

| Molding temperature (° C.) | Yellow Index 45 mm | Aesthetic aspect: visual evaluation |
|---|---|---|
| 240 | 3.9 | good |
| 230 | 3.3 | good |
| 220 | 2.9 | light diffused haze |
| 210 | 2.5 | clearly diffused haze |

TABLE 3

Altuglas GR 9DFG type granules added with 50 ppm of zinc stearate

| Molding temperature (° C.) | Yellow Index 45 mm | Aesthetic aspect: visual evaluation |
|---|---|---|
| 240 | 4.2 | good |
| 230 | 3.5 | light diffused haze |
| 220 | 3.0 | clearly diffused haze |
| 210 | 2.5 | clearly diffused haze |

TABLE 4

Altuglas GR 9DFG type granules added with 75 ppm of zinc stearate

| Molding temperature (° C.) | Yellow Index 45 mm | Aesthetic aspect: visual evaluation |
|---|---|---|
| 240 | 5.2 | good |
| 230 | 4.0 | clearly diffused haze |
| 220 | 3.5 | clearly diffused haze |
| 210 | 3.0 | clearly diffused haze |

Also in this case by reducing the molding temperature the yellow index decreases and the silver stripes indicated in Example 1 disappear. However a diffused haze appears at lower temperatures.

EXAMPLE 3

Example 2 is repeated and the granules of Altuglas 9DFG are added according to the modalities described in Example 2 with 25, 50, 75 ppm of lithium stearate. The samples of granules thus obtained are injection molded under the same conditions of Example 1. The yellow index and the aspect of the articles are evaluated. The results are reported in Tables 5–7.

TABLE 5

Altuglas GR 9DFG type granules added with 25 ppm of lithium stearate

| Molding temperature (° C.) | Yellow Index 45 mm | Aesthetic aspect: visual evaluation |
|---|---|---|
| 240 | 4.0 | good |
| 230 | 3.5 | good |
| 220 | 3.1 | good |
| 210 | 2.7 | good |

TABLE 6

Altuglas GR 9DFG type granules added with 50 ppm of lithium stearate

| Molding temperature (° C.) | Yellow Index 45 mm | Aesthetic aspect: visual evaluation |
|---|---|---|
| 240 | 4.2 | good |
| 230 | 3.5 | good |
| 220 | 2.9 | good |
| 210 | 2.6 | good |

TABLE 7

| Altuglas GR 9DFG type granules with 75 ppm of lithium stearate | | |
|---|---|---|
| Molding temperature (° C.) | Yellow Index 45 mm | Aesthetic aspect: visual evaluation |
| 240 | 4.5 | good |
| 230 | 4.1 | good |
| 220 | 3.7 | good |
| 210 | 3.3 | good |

As it can be noticed from the results compared with the previous examples, the use of lithium stearate as external lubricant solves the problem of the silver stripes and at the same time the diffused haze pointed out with the use of the zinc stearate disappears.

Therefore articles of high thickness having high aesthetic properties combined with good optical properties are obtained.

We claim:

1. Formulations consisting essentially of granules based on acrylic polymers for injection molding at temperatures from 180° C. to 220° C. of articles having a thickness greater than 10 mm, and at least one monovalent salt of at least one saturated or unsaturated $C_{10}$–$C_{18}$ fatty acid as external lubricant, wherein the amount of the monovalent salts of fatty acids in the granules is from 10 to 75 ppm.

2. A method of preparing articles of acrylic polymers comprising injection molding at temperatures from 180° C. to 220° C. of granules based on acrylic polymers to form articles having a thickness greater than 10 mm, said granules consisting essentially of acrylic polymers and at least one monovalent salt of at least one saturated or unsaturated $C_{10}$–$C_{18}$ fatty acid as external lubricant, wherein the amount of the monovalent salts of fatty acids in the granules is from 10 to 75 ppm.

3. The method according to claim 2, wherein the fatty acid salts are selected from the group consisting of oleates, stearates, and palmitates.

4. The method according to claim wherein the monovalent salts are salts of alkaline metals.

5. The method according to claim 4, wherein lithium stearate is the alkaline metal salt.

6. The method according to claim 2, wherein the acrylic polymers of the granules are selected from the group consisting of homopolymers of the alkyl esters of acrylic acid, homopolymers of the alkyl esters of methacrylic acid, copolymers of the alkyl esters of acrylic acid, and copolymers of the alkyl esters of methacrylic acid, wherein the alkyl group contains from 1 to 8 carbon atoms.

7. The method according to claim 6, wherein the acrylic polymers of the granules contain up to 50% by weight of units derived from other monomers containing double bonds, said monomers selected from the group consisting of styrene, alpha-methyl-styrene, acrylonitrile, (meth) acrylamide, n-alkyl maleimides, aryl maleimides, and monomers having double unsaturation.

8. The method according to claim 6, wherein the acrylic polymer of the granules is polymethylmethacrylate.

9. The method according to claim 4, wherein the alkaline metal is lithium, sodium, or potassium.

10. The method according to claim 2, wherein the monovalent salt is an ammonium salt.

* * * * *